United States Patent
Champion

(10) Patent No.: US 10,498,793 B2
(45) Date of Patent: Dec. 3, 2019

(54) SYSTEM AND METHOD FOR DIGITAL COMPRESSION FOR STREAMING DATA

(71) Applicant: Microsoft Technology Licensing, LLC, Redmond, WA (US)

(72) Inventor: Mark Champion, Kenmore, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 183 days.

(21) Appl. No.: 15/664,512

(22) Filed: Jul. 31, 2017

(65) Prior Publication Data

US 2019/0036999 A1 Jan. 31, 2019

(51) Int. Cl.
*H04L 29/06* (2006.01)

(52) U.S. Cl.
CPC .......... *H04L 65/607* (2013.01); *H04L 65/608* (2013.01)

(58) Field of Classification Search
None
See application file for complete search history.

(56) References Cited

U.S. PATENT DOCUMENTS

| | | | |
|---|---|---|---|
| 4,963,995 A | 10/1990 | Lang | |
| 4,995,036 A * | 2/1991 | Copen | H04J 3/1688 348/388.1 |
| 5,067,015 A | 11/1991 | Combridge et al. | |
| 5,315,670 A | 5/1994 | Shapiro | |
| 7,881,373 B2 | 2/2011 | Mihara et al. | |
| 2001/0014122 A1 | 8/2001 | Fu et al. | |

FOREIGN PATENT DOCUMENTS

WO 2014093510 A1 6/2014

* cited by examiner

*Primary Examiner* — Brian Whipple
(74) *Attorney, Agent, or Firm* — Arent Fox LLP

(57) ABSTRACT

The devices and methods for data compression of the present disclosure provide a relatively simple and resource efficient mechanism for compressing digital data by generating a reduced data sequence that either represents a relatively substantial amount of a current value of a current binary data based on some part of the original binary data, or that represents an adjustment to a previous value of previous digital data, which enables a receiver to construct the current value.

22 Claims, 5 Drawing Sheets

SYSTEM AND METHOD FOR DIGITAL COMPRESSION FOR STREAMING DATA

BACKGROUND

The present disclosure relates to systems and methods for compressing and decompressing digital data such as streaming video or audio data.

A transmitter of digital streaming data may apply a compression algorithm to the streaming data in order to reduce the amount of data sent over the network. For example, if a transmitter needs to send 200 megabits of information per image at a rate of 100 images per second, the total bandwidth requirement is 20 gigabits per second. If the compression algorithm has a 5:3 compression ratio, the total bandwidth requirement may be lowered to 12 gigabits per second.

Many methods exist for performing data compression. Some examples of such methods include transform coding, entropy coding, adaptive dictionary coding, chromatic sub-sampling, and other lossless or lossy methods.

Many of these data compression methods may require a significant hardware and software resource expenditure for both the transmitter to perform compression and the receiver to perform decompression. Examples of this hardware and software resource expenditure may include, but are not limited to, processor utilization, power utilization, and bandwidth utilization in communicating the data. Also, these expenditures may include other costs, such as the cost for electro-magnetic interference protection based on the high utilization of the processor and/or power resources. Additionally, for example, many mobile devices have dedicated digital signal processors (DSPs) specifically used for such applications in order to reduce the load on the main processor. Inclusion of DSPs may increase the price of the mobile devices, leading to another such expenditure. Further, even with DSPs, complex compression methods may create computational bottle-necks, increase power consumption, and cause unacceptable delays at the transmitter and the receiver.

Additionally, some devices may not have the computational capacity (software or hardware) to utilize complex compression methods due to limitations on their price, hardware performances, battery life, and/or time required to decompress the compressed data.

Therefore, improvements in data compression techniques are desired.

SUMMARY

The following presents a simplified summary of one or more features described herein in order to provide a basic understanding of such features. This summary is not an extensive overview of all contemplated features, and is intended to neither identify key or critical elements of all features nor delineate the scope of any or all implementations. Its sole purpose is to present some concepts of one or more features in a simplified form as a prelude to the more detailed description that is presented later.

A method and system for transmitting compressed digital data includes identifying a current data value having a first number of total bits, wherein the first number of total bits includes most significant bits, identifying a previous data value, determining a data value difference between the current data value and a previous data value, comparing the data value difference to a relative change threshold, setting one or more flag bits of a reduced data sequence to a first value to indicate an absolute state in response to the data value difference failing to meet the relative change threshold, and to a second value to indicate a relative state in response to the data value difference meeting the relative change threshold, setting data bits of the reduced data sequence to include the most significant bits in response to the data value difference failing to meet the relative change threshold, setting the data bits of the reduced data sequence to include relative bits representing the data value difference in response to the data value difference meeting the relative change threshold, and sending the reduced data sequence to one or more receivers, wherein the reduced data sequence includes a second number of bits that is less than the first number of total bits.

A method and system for receiving compressed digital data includes the steps of receiving a reduced data sequence that includes a flag bit and a first group of data bits, determining a state of the first group of data bits based on a value of the flag bit, wherein the state may include an absolute state or a relative state. The system and method may include the steps of, in response to determining the state as an absolute state: extracting the first group of data bits, padding the first group of data bits with a group of padding bits, and in response to determining the state as a relative state: extracting the first group of data bits, obtaining a previous data value, determining a sign associated with the first group of data bits, and adding or subtracting, depending on the sign, the first group of data bits to the previous data value to obtain a reconstructed data value.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
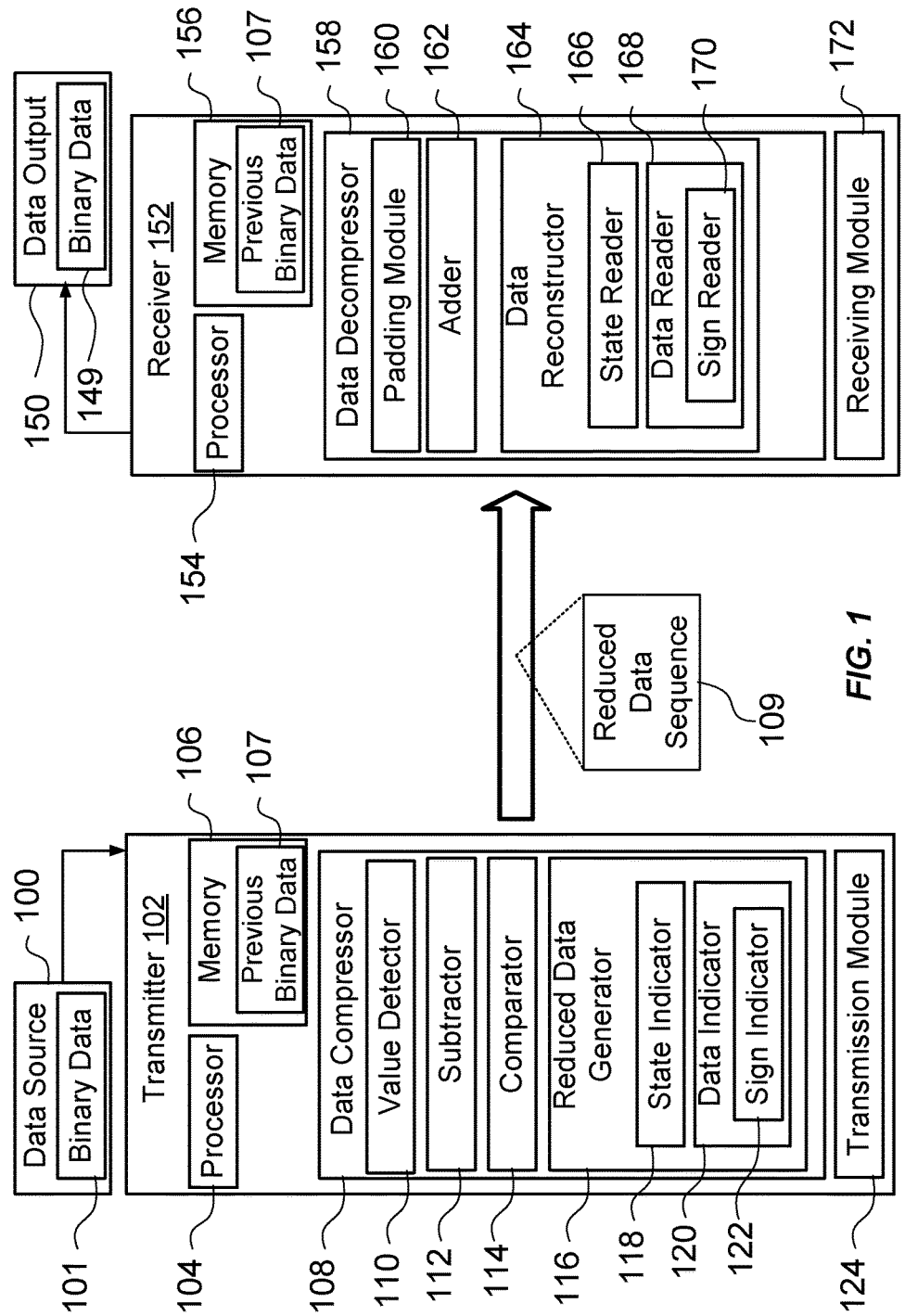
FIG. 1 is a block diagram of an example transmitter and receiver respectively configured for compressing and transmitting, and receiving and decompressing, digital data as described by this disclosure.

The devices and methods for data compression of the present disclosure provide a relatively simple and resource efficient mechanism for compressing digital data by generating a reduced data sequence that either represents a relatively substantial amount of a current value of a current binary data based on some part of the original binary data, or that represents an adjustment to a previous value of previous digital data, which enables a receiver to construct the current value. These devices and methods may not require complex signal processing, and compress the data by either 1) reducing the accuracy of the value of the data of the current clock cycle, or 2) sending an adjusted data value based on the value of the previous data. For example, a transmitter may compress a series of data blocks by reducing the number of bits in each data block. The transmitter compares the value of the current data block with the value of the previous binary data. If the difference fails to meet a relative change threshold, thereby indicating that the change in value is considered a larger, absolute change as opposed to a smaller, relative change, the transmitter generates a reduced data sequence that represents all or a substantial portion of the larger, absolute change in value. For example, in one implementation, the reduced data sequence in this case may include one or more flag bits and a portion of the current data block. The one or more flag bits indicate that the reduced data sequence carries information of absolute value, and the portion includes a set of most significant bits (MSB) of the current data block. The flag further triggers a receiver to add a fixed data sequence to the received reduced data sequence to generate a decompressed data sequence that represents a relatively substantial amount of a current value of a current binary data, and that further allows adjustment within the relative change threshold for a subsequently received reduced data sequence.

Alternatively, if the difference between the values of current and previous binary data meets the relative change threshold, indicating the change is a smaller, relative change, the transmitter generates a different reduced data sequence that represents the relative change in value. For example, in one implementation, the reduced data sequence in this case may include flag bit(s) indicating that the reduced data sequence carries information of relative value, data bits such as a number of least significant bits (LSB) representing the difference between the values of current and previous binary data, and a sign bit indicating if the difference is positive or negative. The flag further triggers the receiver to add or subtract, e.g., based on the value of the sign bit, the data bits (e.g., LSB) of the received reduced data sequence to/from a previous value of the previous decompressed reduced data sequence in order to generate a decompressed data sequence that may accurately represent the current value of a current binary data.

Depending on how these disclosed mechanisms are implemented, an amount of compression of the original binary data, and/or a number of cycles taken for a receiver to obtain an accurate value, may be varied to suit any given accuracy and/or cycle time constraint.

Thus, the reduced data sequence, regardless of the content of its payload, has less bits than the current data block and achieves this data compression in a resource efficient manner. Once the reduced data sequence is constructed, the transmitter sends the sequence to the receiver, which decompresses the sequence accordingly to obtain the original value or a value that substantially represents the original value.

Referring now to FIG. 1, in some implementations, a data source 100 may send binary data 101 to a transmitter 102, which includes a processor 104 and a memory 106 configured to instantiate a compressor 108 for sending a reduced data sequence 109 based on binary data 101 to a receiver 152. For example, upon receiving the binary data 101, the transmitter 102 may route the binary data 101 to the compressor 108 for compression. The compressor 108 may include a value detector 110 that identifies a current data value of the binary data 101. In some implementations, the binary data 101 may be digital data such as, but not limited to, video data and/or audio data. For instance, the video data may be image data, such as data representing color and/or texture characteristics of a pixel of the image, and value detector reads the value of the pixel. Next, the compressor 108 may execute a subtractor 112 that obtains a value of a previous binary data 107 from, for example, the memory 106, and calculates a difference between the current data value and the previous data value. The compressor 108 may include and execute a comparator 114 that compares the difference to a relative change threshold to identify whether the reduced data sequence 109 should be constructed as an adjustment to a prior data value, e.g., a relative value, or constructed to indicate a larger or absolute value. As such, the relative change threshold may be a value or a range of values that define an amount of change in value that can be indicated by reduced data sequence in the configuration that represents the relative value. For example, the relative change threshold may equal a largest positive number or a smallest negative number that can be represented by the bits of the relative value. Further, the compressor 108 may include and execute a state indicator 118 to generate one or more flag bits that identify whether the reduced data sequence represents an absolute or relative value, a data generator 120 to generate a set of payload data bits that represent the data value conveyed by the reduced data sequence 109, and, optionally, e.g., when a relative value is conveyed, a sign indicator 122 that generates one or more bits that identify if the payload data bits are to be added or subtracted from a value of the previous binary data 107.

If the difference fails to meet the relative change threshold, the reduced data generator 116 creates the reduced data sequence 109 using the state indicator 118 and the data generator 120. The state indicator 118 sets the one or more flag bits of the reduced data sequence 109 to indicate that the reduced data sequence 109 includes an absolute value. Further, in the case of an absolute value, the data generator 120 extracts a portion of the bits of the binary data 101, such as a portion representing a substantial amount of the current data value, and places it in the payload of the reduced data sequence 109. For instance, the portion of data extracted from the binary data 101 may be a portion that represents a substantial amount or all of the value, and may include a number and a value of most significant bits (MSB) of the current binary data 101. For example, the number of the MSB of the binary data 101 may vary depending on an accuracy tolerance, e.g., how accurate the decompressed value should be, and/or based on a latency tolerance, e.g., how many cycles is required to reach an accurate decompressed data value. Additionally, in some implementations, the payload data bits may correspond to a fixed set of bits, e.g., matching a number of all or part of the remaining bits of the binary data 101, where the receiver 152 can decompress the reduced data sequence 109 by combining the payload data bits with the fixed set of bits.

In contrast, if the difference is less than the relative change threshold, the reduced data generator 116 creates the reduced data sequence 109 with different contents that indicate a relative change in value from the prior value of the prior binary data. For example, the reduced data generator 116 creates the reduced data sequence 109 using the state indicator 118, the data generator 120, and the sign indicator 122. In this case, the state indicator 118 sets the one or more flag bits to indicate that the reduced data sequence 109 includes a relative value. The data generator 120 sets the set of payload data bits to a value of the difference between the current and the previous data values of current binary data 101 and previous binary data 107, respectively. For instance, in some implementations, the data generator 120 may set the payload data bits to the difference value using a number of bits that correspond to a number of least significant bits (LSB) of the binary data 101 (but not necessarily the actual value of such bits in the binary data 101). For example, the number of bits of the LSB of the binary data 101 may vary depending on an accuracy tolerance, e.g., how accurate the decompressed value should be, and/or based on a latency tolerance, e.g., how many cycles is required to reach an accurate decompressed data value. Finally, the sign indicator 122 includes a sign bit having a value to indicate whether the data generator 120, e.g., the difference in value, is a positive or negative value.

After the construction of the reduced data sequence 109 that represents either the absolute change or the relative change in value, the compressor 108 forwards the reduced data sequence 109 to a transmission module 124 that is configured to send the reduced data sequence 109 to the receiver 152. The transmitter 102 may include a local duplicate of the reduced data sequence 109 and/or a decompressed value of the reduced data sequence 109 as will be obtained by receiver 152 to keep track of the information relating to the reduced data sequence 109 being processed by the receiver 152.

Still referring to FIG. 1, in some implementations, the receiver 152 includes a processor 154 and a memory 156 configured to instantiate a decompressor 158 for decompressing the received reduced data sequence 109 and obtaining a decompressed binary data 149. The decompressed binary data 149 may have a value that exactly matches the value of binary data 101, e.g., when the reduced data sequence 109 represents the relative value, or a value that represents a substantial amount of the value of binary data 101, e.g., when the reduced data sequence 109 represents the absolute value. During operation, the receiver 152 utilizes a receiving module 172 to receive the reduced data sequence 109 sent by the transmitter 102. Next, the receiver 152 instantiates a decompressor 158 having a data reconstructor 164 that begins to decompress the data bits in the reduced data sequence 109. For example, the data reconstructor 164 includes a state reader 166 configured to read the one or more flag bits, e.g., the bits included by the state indicator 118, and determine the type of data in the reduced data sequence 109. Further, the data reconstructor 164 includes a data reader 168 that is executable to read the payload data bits, e.g., the bits included by the data generator 120, to identify a value associated with the reduced data sequence 109.

For example, if the state reader 166 determines that a value of the one or more flag bits included by the state indicator 118 indicate that the reduced data sequence 109 represents an absolute value, the data reader 168 reads the payload data bits and a padding module 160 adds the fixed set of bits in order to decompress the reduced data sequence 109. For instance, in one implementation where the payload data bits are a set of MSB extracted from the binary data 101, e.g., a first number of the bits of the binary data 101, the padding module 160 pads the MSB with additional padding bits, e.g., a second number of bits such as a remaining number of bits of the binary data 101. In this example, the reconstructed data block that includes the most significant bits of the current data block and the padding bits, e.g., the decompressed binary data 149, may have the same number of bits as the current data block, e.g., the current binary data 101.

Alternatively, if the state reader 166 determines that a value of the one or more flag bits indicate that the reduced data sequence 109 represents a relative value, the data reader 168 may read the payload data bits to extract a relative value that can be added to and/or subtracted from a value of a previously decompressed binary data. For example, the payload data bits may have a value that is substantially less than a value of the payload bits extracted from the binary data 101 when the reduced data sequence 109 represents an absolute value. For instance, in this case, the payload data bits may be a set of least significant bits (e.g., relative to a number of bits in the binary data 101) that represent a value of the difference between the value of the current binary data 101 and the value of a previous binary data 107, e.g., sent in a prior transmission by the transmitter 102. Further, the decompressor 158 includes and executes a sign reader 170 configured to read a value of the sign bit to determine if the difference (e.g., the value of the payload data bits) is positive or negative. Next, the decompressor 158 includes and executes an adder 162 configured to add or subtract, depending on the value of the sign bit, the difference to/from the value of the previous binary data 107 to obtain a reconstructed data block that is the decompressed binary data 149. The adder 162 may obtain the value of the previous binary data 107 from the memory 156, for example. The receiver 152 may send the decompressed binary data 149 to the data output 150. The data output 150 may be a display, a speaker, or other devices.

Figure 2:
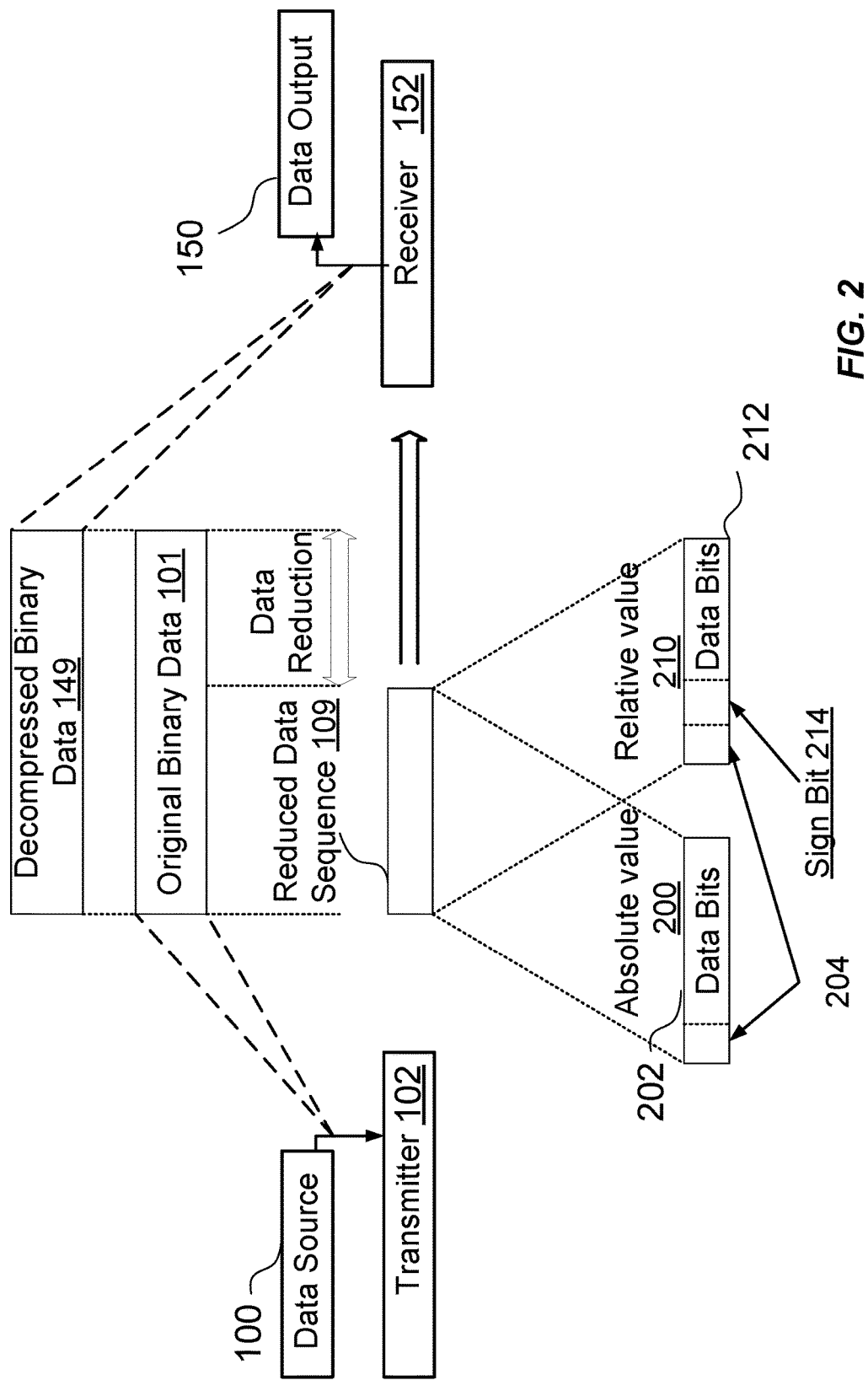
FIG. 2 is a block diagram of an example of the transmission of compressed data.

Referring now to FIG. 2, in one non-limiting example of the binary data 101, the reduced data sequence 109, and the corresponding decompressed binary data 149, the original binary data 101 may have i bits, where i is a positive integer. The reduced data sequence 109 may have j bits, where j is a positive integer smaller than i. The amount of data reduced from the compression methods of the present application is i–j bits. The reduced data sequence 109, if including the absolute value 202, may have one or more flag bits 204, and payload data bits 202 including the most significant bits of the current binary data 101. If the reduced data sequence 109 includes the relative value 210, the sequence may include one or more flag bits 204, a sign bit 214, and payload data bits 212 indicating the difference in value between the current binary data 101 and the previous binary data 107. After performing decompression, the decompressed binary data 149 may have the same number of bits as the current binary data 101. For example, in the case of the reduced data sequence 109 representing the absolute value 200, the decompressed binary data 149 may include a first set of bits corresponding to the set of bits extracted from the binary data 101 and a second set of bits corresponding to a fixed set of bits. The value of the fixed set of bits may be set so that it is in a middle of a range of the relative value 210 of a subsequent reduced data sequence so that the value of a subsequent decompressed binary data can exactly match a value of a subsequent binary data compressed and transmitted by the transmitter 102.

In some implementations, the compression devices and methods of the present application may be utilized to compress pixel values of an image. For example, the transmitter 102 may reorganize an image into a series of raster-scanned pixels. Each pixel includes a value indicating a gray scale of the pixel, ranging from, for example, 0 (all black) to 1023 (all white). In this example, since there are 1024 different values, the gray scale of the pixel may be represented by a 10 bits pixel value. The transmitter 102 may compress the pixel data by sending a reduced data sequence having less than 10 bits, such as the most significant m bits, where m is an integer from 1 to 8, and one or more flag bits. In another example, the transmitter 102 may compress the pixel data by sending a set of n least significant bits, where n is an integer from 1 to 7, one or more flag bits, and a sign bit. In this case, the set of n least significant bits may have a value corresponding to the difference between the current and previous pixel values. The integers m and n may be the same or different. Data reduction occurs when the reduced data sequence 109 has less bits than the pixel value represented by the current binary data 101. Other applications in addition to or instead of image data transfer applications may also utilize the compression devices methods of the present application.

Figure 3:
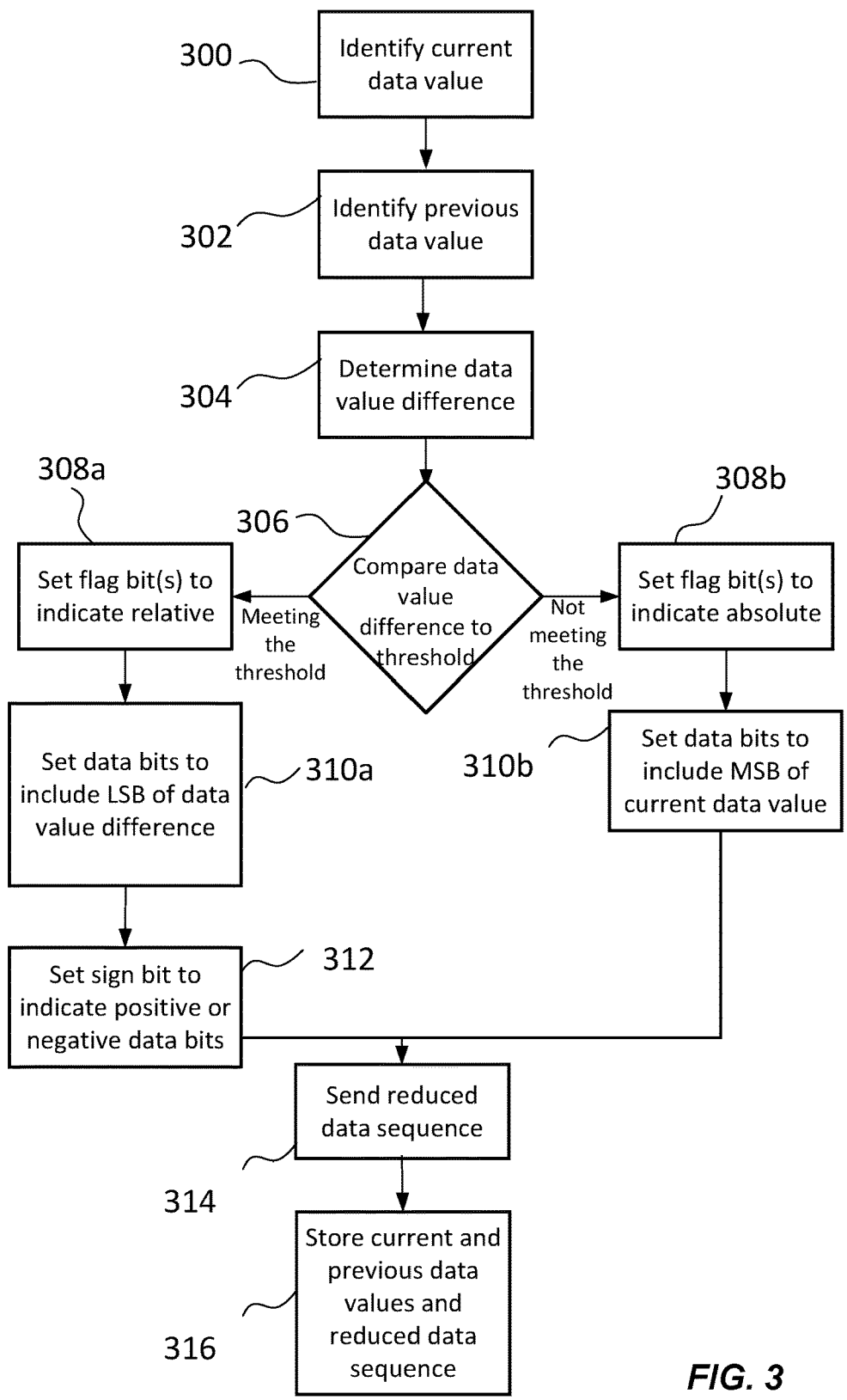
FIG. 3 is a flow chart of an example compression method of the present disclosure.

Referring now to FIG. 3, with reference to FIG. 1, in a non-limiting example operation of one iteration of transferring compressed pixel data using the devices and methods of this disclosure, where the pixel data is represented by a 10 bit value, the transmitter 102 may identify (300) the current pixel value from the binary data sent by the data source 100. For example, the data value detector 110 in the transmitter 102 may identify the current pixel value as 1101001011 in binary or 843 in decimal.

Further, the transmitter 102 may identify (302) the previous pixel value. For example, the previous pixel value may be 1 in decimal or 0000000001 in binary. The data value detector 110 in the transmitter 102 may obtain the previous pixel value from the memory 106. If the current pixel value is the first pixel in a stream, the value detector 110 may not identify (302) the previous pixel value, or identify a default value as the previous pixel value, such as 0 in decimal or 0000000000 in binary.

Next, the transmitter 102 may determine (304) the pixel value difference between the current pixel value and the previous pixel value. For example, subtractor 112 may subtract the binary number 0000000001 (or 1 in decimal) from 1101001011 (or 843 in decimal) to determine (304) the difference of 1101001010 (or 842 in decimal).

Next, the transmitter 102 may compare (306) the pixel value difference between the current and previous pixel values to a predetermined relative change threshold. For example, comparator 114 may compare (306) the pixel value difference with the relative change threshold. If the pixel value difference fails to meet the relative change threshold, then transmitter 102 may send a reduced data sequence 109 having an absolute value (e.g., at 308a, 310a, 312, and 314), whereas the transmitter 102 may send a reduced data sequence having a relative value when the pixel value difference meets the threshold (e.g., at 308b, 310b, and 314).

In one example, which should not be construed as limiting, given the relative change threshold being a range from −0000010000 in binary or −16 in decimal to +0000001111 in binary or +15 in decimal, any pixel value difference that fails to meet this threshold will result in the transmitter 102 sending a reduced data sequence 109 of absolute value. Conversely, if the difference meets this threshold, the transmitter 102 may send a reduced data sequence 109 of relative value (explained in more detail below). In this example, the reduced data sequence 109 of relative value is designed to indicate the relative value using a signed 5 bit number, and this corresponds to the relative change threshold ranging from −16 to +15. It should be understood that other configurations may be utilized, e.g., using a different number of bits and/or using or not using a signed number, which can result in the relative change threshold having a different value or range of values. Generally, the relative change threshold may be any number or any range of numbers, but in an implementation the number or range of numbers may correspond to a maximum value that can be indicated by the reduced data sequence 109 of relative value in order to enable the receiver 152 to make a relative adjustment (as opposed to an absolute adjustment) to a value of a previously decompressed pixel data.

In another non-limiting example, given the relative change threshold being a range from −16 to +15, a previous pixel value of 1000000100 in binary, or 516 in decimal, and a current pixel value of 0111110100 in binary, or 500 in decimal, the comparator 114 would calculate a pixel value difference of −16. Since the pixel value difference meets the relative change threshold, the transmitter 102 may send the reduced data sequence 109 that includes a relative value of −16 to cause the pixel value to be reduced from 516 to 500.

Regarding the case where the reduced value sequence 109 having the absolute value is sent, in some implementations, the transmitter 102 may set (308b) the one or more flag bits to indicate a reduced data sequence of absolute value. For example, the state indicator 118 of the reduced data generator 116 may set (308b) a flag bit of the reduced data sequence to the value of 1 to indicate the absolute value. Other representations are possible.

Next, in certain implementations of the case where the reduced value sequence 109 having the absolute value is sent, the transmitter 102 may set (310b) the data bits to include the most significant bits of the current pixel value. For example, the data generator 120 of the reduced data generator 116 may set (310b) the data bits to include 11010, which is one example MSB of current pixel value of 1101001011. The most significant bits may also include the first two highest order bits (<u>11</u>01001011), the first three highest order bits (<u>110</u>1001011), the first four highest order bits (<u>1101</u>001011), or the first six highest order bits (<u>110100</u>1011), or any other number of most significant bits, depending on the implementation.

Moreover, the transmitter 102 and receiver 152 may both have knowledge that the reduced data sequence 109 having the absolute value should be associated with a fixed set of bits, e.g., padding bits, which are added to the transmitted data bits by the receiver 152 in order to obtain the decompressed pixel data. In an implementation, the number and/or value of the fixed set of bits may be at a midpoint of the adjustment that may be obtained via the reduced data sequence having the relative value, e.g., when such relative value is accompanied by a sign bit.

In this case where the reduced value sequence 109 having the absolute value is sent, after setting the flag bit and the data bits, the transmitter 102 may send (314) the reduced data sequence 109 having the absolute value to the receiver 152. For example, the transmitter 102 may utilize the transmission module 124 to send (314) the sequence, including the flag and data bits, of 111010 to the receiver 152. Here, the first bit may be the flag bit and the remaining bits may be the data bits. The transmission module 124 may use BUS lines, wires, cables, Bluetooth, near-field communication (NFC), Wi-Fi, local area network (LAN), or any suitable wired and/or wireless medium, to send the reduced data sequence 109.

In contrast to the absolute value example, in other cases, the transmitter 102 may send the reduced data sequence 109 having a relative value. For example, compressor 108 operating with a current pixel value of 1101011110 and a previous pixel value of 1101010000 will execute the subtractor 112 to generate a pixel value difference of 0000001110 (or 14 in decimal). With a relative change threshold value in the range of −16 to +15, the pixel value difference of 14 meets the relative change threshold value. In this case, in some implementations, the transmitter 102 may set (308a) the one or more flag bits to indicate a reduced data sequence of relative value. For example, the state indicator 118 of the reduced data generator 116 may set a flag bit of the reduced data sequence to the value of 0 to indicate relative value of the reduced data sequence. Other representations are possible.

Next, in certain implementations of this case where the reduced value sequence 109 having the relative value is sent, the transmitter 102 may set (310a) the data bits to include a number of least significant bits that have a value equal to the pixel value difference. For example, the data generator 120 of the reduced data generator 116 may set (310a) the data bits to be 1110 (or 14 in decimal), which is one example LSB of the pixel value difference of 0000001110. The least significant bits may also include a number of bits corresponding to the first two lowest order bits (00000011<u>10</u>), the first three lowest order bits (0000001<u>110</u>), the first five lowest order bits (00000<u>01110</u>), or the first six lowest order bits (0000<u>001110</u>), or any other number of least significant bits that have a value of the pixel value difference.

Further, in some implementations of this case where the reduced value sequence 109 having the relative value is sent, the transmitter 102 may set (312) the sign bit to indicate whether the LSB of the pixel value difference is a positive or negative value. For example, the sign indicator 122 may set (312) the sign bit to 1 to indicate a positive pixel value difference of 0000001110, or to 0 to represent a negative pixel value difference. Other representations are possible.

After setting the flag bit, the data bits, and the sign bit, the transmitter 102 may send (314) the reduced data sequence having the relative value to the receiver 152. For example, the transmitter 102 may utilize the transmission module 124 to send (314) the sequence, including the flag, sign, and data bits, e.g., 011110 in this example, to the receiver 152. Here, the first bit may be the flag bit, the second bit may be the sign bit, and the remaining bits may be the data bits. The transmission module 124 may use BUS lines, wires, cables, Bluetooth, near-field communication (NFC), Wi-Fi, local area network (LAN), or any suitable wired and wireless medium, to send the sequence.

Next, in either of the above two cases, the transmitter 102 may store (316) the current data value, the previous data value, and/or the reduced data sequence in the memory 106. For example, the processor 104 may store (316) the current data value, the previous data value, and/or the reduced data sequence in the memory 106. The stored numbers may be used to update the previous binary data 107 for the next compression cycle.

Figure 4:
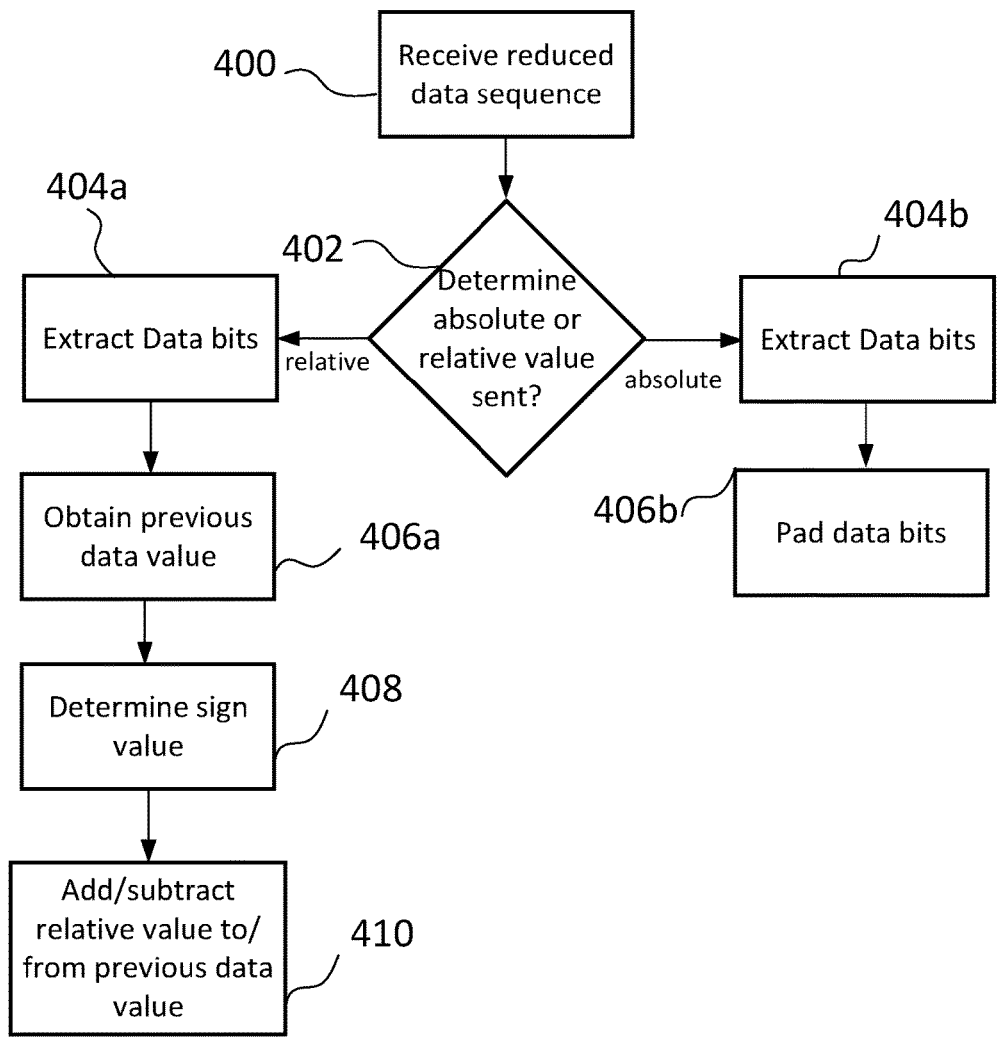
FIG. 4 is a flow chart of an example decompression method of the present disclosure.

Referring now to FIG. 4, with reference to FIG. 1 and relative to the operation of the transmitter 102 described in FIG. 3, the receiver 152 may receive (400) the transmitted reduced data sequence 109. For example, the receiving module 172 may receive a reduced data sequence 109, e.g., having a value of 111010 for an absolute value in this continuing example, from the transmitter 102.

After the reception, the receiver 152 may determine (402) if the data bits in the reduced data sequence include absolute or relative values. For example, the state reader 166 in the data reconstructor 164 reads the one or more flag bits in the reduced data sequence to make the determination. For the reduced data sequence of 111010, the flag bit indicates an absolute value in the data bits.

Next, the receiver 152 extracts (404b) the data bits from the reduced data sequence. For example, the data reader 168 of the data reconstructor 164 may extract (404b) the bits 11010 from the reduced data sequence 111010. The data bits are identical to the MSB of the current pixel value.

In some implementations, the receiver 152 pads (406b) the extracted data bits with a known, fixed set of bits. For example, the padding module 160 may append 5 padding bits to the least significant end of the extracted data bits 11010 to generate the reconstructed, decompressed pixel value. In one example, which should not be construed as limiting, the padding module 160 may append 10000 to the extracted data bits to generate a reconstructed pixel value of 1101010000. Alternatively, the padding module 160 may append 00000 to the extracted data bits to generate a reconstructed pixel value of 1101000000. In yet another example, the padding module 160 may append 11111 to the extracted data bits to generate a reconstructed pixel value of 1101011111. Other padding bits combinations are possible, depending on the implementation, e.g., based on the amount of relative adjustment that is possible. In certain examples, the padding bits may be equal to (in magnitude) the largest negative relative value that can be transmitted (e.g. −16), such as +16 or 10000, which allows a pixel value (or relative adjustment value) of 0 to be sent.

Alternatively, still referring to FIG. 4, in some implementations, the receiver 152 may determine (402) that the data bits in the reduced data sequence include relative values. For example, the state reader 166 in the data reconstructor 164 reads the one or more flag bits in the reduced data sequence to make the determination. For example, in the case where compressor 108 operates with the current pixel value of 1101011110 and the previous pixel value of 1101010000, the receiver 152 would receive the reduced data sequence of 011110, and the flag bit (e.g., the first bit) of 0 indicates a relative value in the data bits.

In some implementations of this alternative, the receiver 152 extracts (404a) the data bits from the reduced data sequence and treats them as a value by which to adjust a previous pixel value. For example, the data reader 168 of the data reconstructor 164 may extract (404a) the bits 1110 from the reduced data sequence 011110. The value of the data bits are identical to the value of the pixel value difference.

Next, in certain implementations, the transmitter 152 obtains (406a) the previous pixel value. For example, the data reconstructor 164 may obtain the previous pixel value from the memory 156. Here, the previous pixel value from the memory 156 may be 1101010000.

Further, in some implementations, the transmitter 152 determines (408) the sign value of the data bits in the reduced data sequence having the relative value. For example, the sign reader 170 in the data reconstructor 164 determines the sign value by reading the sign bit in the reduced data sequence. For instance, in this example, the second bit with the value of 1 is the sign bit, and the value of 1 indicates that the data bits are positive (and a value of 0 would indicate a negative, although other bit value and sign value combinations are possible).

Consequently, in some implementations, the receiver 152 adds (410) the extracted data bits to the previous pixel value. For example, the adder 162 may generate the sum of the extracted data bits, 1110 (with a positive or negative value depending on the sign bit), and the previous pixel value, e.g., 1101010000 in this case, to generate the reconstructed, decompressed pixel value of 1101011110, which is identical to the current pixel value received by the transmitter 102 prior to compression. The processor 154 may optionally store the reconstructed, decompressed pixel value in the memory, or send the reconstructed pixel value to another entity, such as but not limited to a display.

In some implementations, the transmitter 102 may intend to transmit digital data, such as an image. The image may be a black and white image or a color image. Each pixel of a black and white image may include gray scale data, represented by a numeric value, indicating the gray scale of the pixel. For example, an all-black pixel may have a gray scale data value of 0, and an all-white pixel may have a value of 1023 represented by a 10 bit number. Various shades of gray may have values ranging from 1 to 1022.

In other implementations, the image may be a color image. Each pixel of a color image may include one or more color scale data. For example, a pixel may have red, green, and blue scale data. An all-red pixel may have a red scale data value of 1023, a green scale data value of 0, and a blue scale data value of 0. An all-blue pixel may have a red scale data value of 0, a green scale data value of 0, and a blue scale data value of 1023. An purple pixel may have a red scale data of 511, a green scale data value of 0, and a blue scale data value of 511. Other colors may be represented by different color scale data values.

In some implementations, the gray and color scale data may each be represented by a 10-bit number. Alternatively, the gray and color scale data may be represented by a 4-bit number, a 5-bit number, an 8-bit number, a 12-bit number, a 15-bit number, or a 18-bit number. Other numbers of bits are possible.

In some implementations, the gray scale data values of pixels of an image may be transmitted in sequence. For example, for an image with a resolution of 1,920×1,200, the transmitter 102 may first transmit the data value of the left-most pixel of the top-most row of 1,920 pixels ($1^{st}$ pixel), and sequentially transmit the data value of each pixel in the top most row until the right-most pixel ($1,920^{th}$ pixel). The transmitter 102 may continue transmitting the left-most pixel of the second top-most row ($1,921^{st}$ pixel) until reaching right-most pixel of the bottom-most row ($2,304,000^{th}$ pixel). This raster scanning method may transmit one or more pixels at a time. Other sequences of transmission are possible.

In another example, the data value detector 100 may identify (300) a current pixel value of 502 in decimal (0111110110 in binary) and identify (302) the previous value of 498 in decimal (0111110010 in binary). After the subtractor 112 determines (304) the pixel value difference of 4 in decimal (0000000100 in binary), the comparator 114 may compare (306) the pixel value difference with a relative change threshold of 10000, and decide to send a reduced data sequence with a relative value to the receiver 152. The state indicator 118 first sets (308a) the flag bit to indicate a relative value of, for example, 0. Next, the data generator 120 may set (310a) the data bits to include a number of LSB with a value identical to the pixel value difference, for example, 0100 in binary (4 in decimal). Next, prior to transmission, the sign indicator 122 sets (312) the sign bit to indicate a positive sign of the LSB of the pixel value difference. Since the pixel value is greater than the reference value, the sign may be a positive sign, denoted by a 1, for example. In this example, the transmission module 124 of the transmitter 102 may send (314) the reduced data sequence including the flag bit, the sign bit, and the data bits to the receiver 152. The reduced data sequence of 010100 indicates to the receiver 152 that a positive value of 4 in decimal (0100 in binary) should be added to the previous pixel value of 498 in decimal (0111110010 in binary) to achieve the current pixel value of 502 in decimal (0111110110 in binary). Here, the first bit may be the flag bit, the second bit may be the sign bit, and the remaining bits may be the data bits.

In certain implementations, the transmitter 102 may append one or more cyclic redundancy check bits to the reduced data sequence prior to transmission. If the receiver 152 detects an error in the reduced data sequence 109, the receiver 152 may wait for the transmitter 102 to resend the same reduced data sequence 109, request the transmitter 102 to resend the same sequence, attempt to recover the lost bits, or discard the sequence.

While the examples above illustrate the compression of image data, other types of data may also be compressed with the methods of the present disclosure, such as audio data, alpha-numeric data, seismic data, scientific research data, and other suitable data.

Further, in some implementations, the data reduction may be greater than 40% by decreasing the length of the reduced data sequence. For example, the transmitter 102 may generate a reduced data sequence having 1 flag bit and 4 data bits with the value of 1010, which is the MSB of the 101010111000. Next, the transmitter 102 may send a reduced data sequence having 1 flag bit, and 4 relative center significant bits. Next, the transmitter 102 may send another reduced data sequence having 1 flag bit, and 4 relative least significant bits. In this example, the compression ratio may be 12:5, although this example uses three steps to transmit the pixel values. Other compression ratios may also be achieved by selecting the lengths of the data bits and flag bits for the reduced data sequence.

Figure 5:
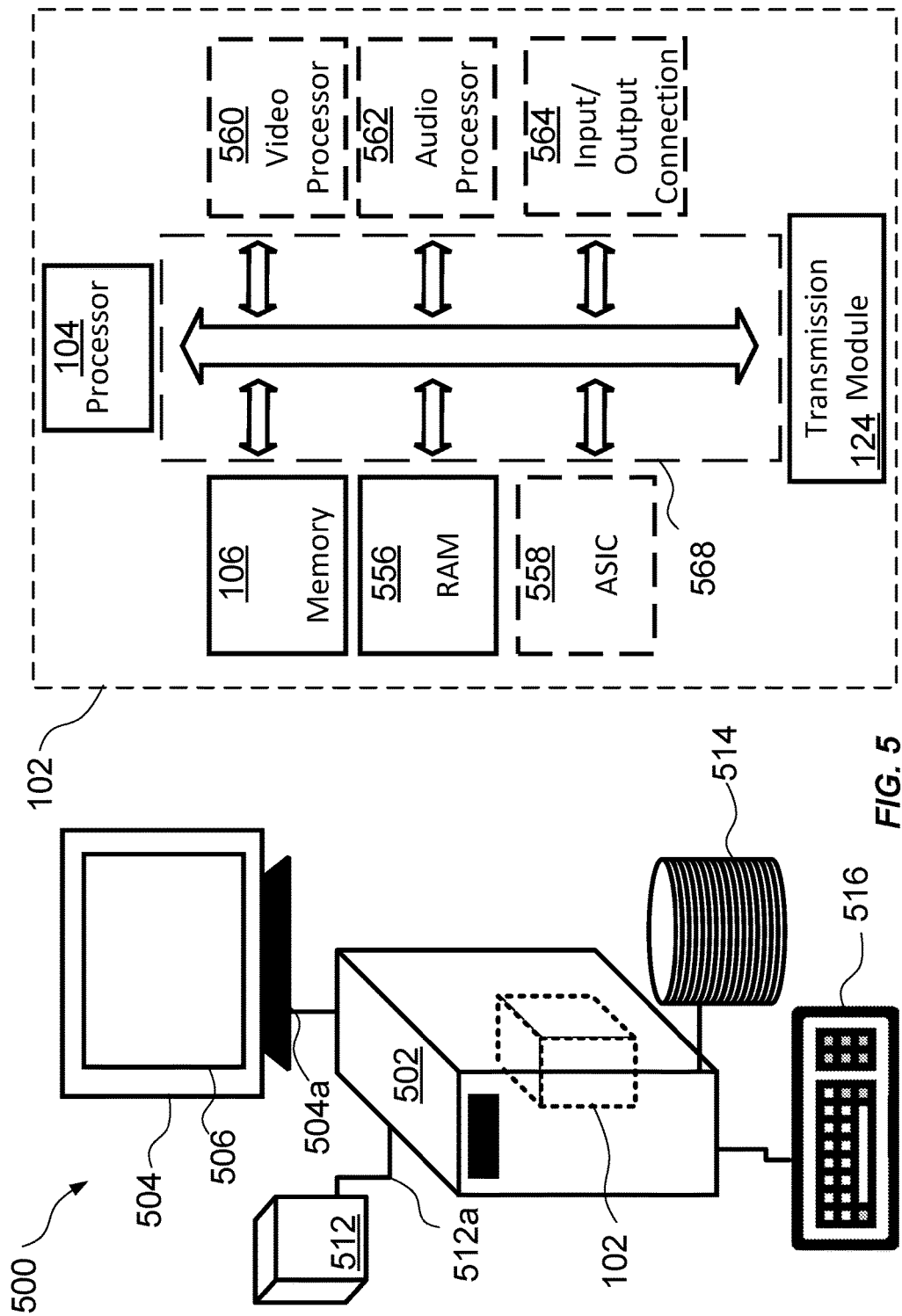
FIG. 5 is a block diagram of a computing device including the transmitter.

Referring now to FIG. 5, in certain implementations, the transmitter 102 and receiver 152 may be part of a computing system 500, while in other cases the transmitter 102 may be part of one computing system and the receiver 152 part of a different computing system. In some cases, the transmitter 102 may be associated with a data source, and the receiver 152 may be associated with a data bus or other mechanism for transporting or distributing the reduced data sequence 109. The computing system 500 may include a computer 502 connected to a display 504 via a display connector 504a. The display 504 includes a screen 506, which may be a liquid crystal (LCD) screen, a plasma screen, an organic light emitting diode (OLED) screen, a cathode ray tube (CRT) screen, or a digital light processing (DLP) screen. Other types of screens are possible. The screen 506 may be touch sensitive. The screen 506 may have any size ranging from a size for use by a single user to a size viewable by a large number of users (e.g., a display at an arena). The display connector 504a may be any suitable cable that transmits display information from the computer 502 to the display 504. Alternatively, the display 504 may connect wirelessly to the computer 502.

In some implementations, the computer 502 is connected to a speaker 512 via a speaker connector 512a. The speaker 512 may be a dynamic cone speaker, a piezoelectric speaker, a magnetic speaker, an electrostatic speaker, a plasma arc speaker, a thermos-acoustic speaker, or any suitable speaker. The speaker connector 512a may be any suitable cable that transmits speaker information from the computer 502 to the speaker 512. Alternatively, the speaker 512 may connect wirelessly to the computer 502.

In certain implementations, the computer 502 includes an external storage 514, an input/output device 516. The external storage 514 may be an on-site external storage such as a back-up hard drive, a local server, or another computer. Alternatively, the external storage 514 may be a remote network server or a cloud bank. Other external storage solutions are possible. The input/output device 516 may be a keyboard, a mouse, a joystick, or a combination thereof.

Still referring to FIG. 5, the transmitter 102 may include the processor 104, the memory 106, the random access memory (RAM) 556, and the transmission module 124. The processor 104 may be an integrated circuit or a system on chip (SoC). Moreover, the processor 104 can be implemented as an integrated processing system and/or a distributed processing system.

In some implementations, the memory 106 may be implemented as a single memory or partitioned memory. In some examples, the operations of the memory 106 may be managed by the processor 104. The memory 106 can include any type of memory usable by a computer, such as read only memory (ROM), flash memory, tapes, magnetic discs, optical discs, non-volatile memory, and any combination thereof. Additionally, the processor 104 and memory 106 may include and execute an operating system.

In some implementations, the RAM 556 may include static RAM, dynamic RAM, or any suitable volatile memory for the transmitter 102.

In some implementations, the components of the transmitter 102 may be interconnected via a bus controller 568. The bus controller 568 may include one or more integrated circuits, such as bridges, that direct bus traffic among the components.

In some examples, the transmitter 102 may include optional components such as the ASIC 558, the video processor 560, the audio processor 562, and the input/output connection 564.

In exemplary implementations, the transmitter 102 may alternatively use an application specific integrated circuit (ASIC) 558 to implement the functionality described herein. Depending on the applications, other ASIC may also be added to the transmitter 102. Examples of ASIC include digital signal processor (DSP), arithmetic logic processor, co-processor to the processor 104, and graphic processors.

In some implementations, the receiver 152 may include similar components as the transmitter 102. The receiver 152 may be implemented in a standalone computing device, or as a microcontroller in a display, speaker, or devices.

As used in this application, the terms "device," "component," "system," and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device, which can be a wired device or a wireless device. A wireless device may be a computer, a gaming device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Further, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc., and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof specially-designed to perform the functions described herein. A specially programmed general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in transmitter 300. In the alternative, the processor and the storage medium may reside as discrete components in transmitter 300. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A method of transmitting compressed digital data, comprising:
    identifying a current data value having a first number of total bits, wherein the first number of total bits includes most significant bits of the total bits;
    identifying a previous data value;
    determining a data value difference between the current data value and a previous data value;
    comparing the data value difference to a relative change threshold;
    setting one or more flag bits of a reduced data sequence to a first value to indicate an absolute state in response to the data value difference failing to meet the relative change threshold, and to a second value to indicate a relative state in response to the data value difference meeting the relative change threshold;
    setting data bits of the reduced data sequence to include the most significant bits in response to the data value difference failing to meet the relative change threshold;
    setting the data bits of the reduced data sequence to include relative bits representing the data value difference in response to the data value difference meeting the relative change threshold; and
    sending the reduced data sequence to one or more receivers, wherein the reduced data sequence includes a second number of bits that is less than the first number of total bits.

2. The method of claim 1, wherein the relative change threshold equals a largest positive number or a smallest negative number that can be represented by the relative bits.

3. The method of claim 1, further comprising, in response to the data value difference failing to meet the relative change threshold, pad the data bits with a group of padding bits to generate a decompressed binary data.

4. The method of claim 3, wherein the group of padding bits includes a padding value such that a sum of the padding value and a largest possible negative number represented by the relative bits is zero.

5. The method of claim 4, further comprising using the decompressed binary data as a next previous data value.

6. A method of receiving compressed digital data, comprising:
    receiving a data sequence that includes a flag bit and a first group of data bits;
    determining a state of the first group of data bits based on a value of the flag bit, wherein the state may be an absolute state or a relative state;
    in response to determining the state as an absolute state:
        extracting the first group of data bits from the data sequence,
        padding the first group of data bits with a group of padding bits, and
    in response to determining the state as a relative state:
        extracting the first group of data bits from the data sequence,
        obtaining a previous data value,
        determining a sign associated with the first group of data bits, and
        adding or subtracting, depending on the sign, the first group of data bits to the previous data value to obtain a reconstructed data value.

7. The method of claim 6, wherein the group of padding bits includes a padding value such that a sum of the padding value and a largest possible negative number represented by the first group of data bits is zero.

8. The method of claim 6, further comprising validating an accuracy of one or more cyclic redundancy check bits associated with the data sequence.

9. The method of claim 6, further comprising at least one of waiting to receive a duplicate of the data sequence, requesting a duplicate of the data sequence, or ignoring the data sequence.

10. The method of claim 6, further comprising displaying an image that includes a data having the reconstructed data value.

11. A system for sending compressed digital data, comprising:
a memory;
one or more processors configured to:
identify a current data value having a first number of total bits, wherein the first number of total bits includes most significant bits of the total bits;
identify a previous data value,
determine a data value difference between the current data value and a previous data value,
compare the data value difference to a relative change threshold,
set one or more flag bits of a reduced data sequence to a first value to indicate an absolute state in response to the data value difference failing to meet the relative change threshold, and to a second value to indicate a relative state in response to the data value difference meeting the relative change threshold,
set data bits of the reduced data sequence to include the most significant bits in response to the data value difference failing to meet the relative threshold, and
set the data bits of the reduced data sequence to include relative bits representing the data value difference in response to the data value difference meeting the relative change threshold; and
a transmission module configured to send the reduced data sequence to one or more receivers, wherein the reduced data sequence includes a second number of bits that is less than the first number of total bits.

12. The system of claim 11, wherein the memory stores a decompressed value calculated from the reduced data sequence.

13. The system of claim 11, wherein the one or more processors are further configured to add cyclic redundancy check bits to the reduced data sequence.

14. The system of claim 11, wherein the relative change threshold equals to a largest positive number or a smallest negative number that can be represented by the relative bits.

15. The system of claim 11, wherein the one or more processors are further configured to, in response to the data value difference failing to meet the relative change threshold, pad the data bits with a group of padding bits to generate a decompressed binary data.

16. The system of claim 15, wherein the one or more processors are further configured to comprising using the decompressed binary data as a next previous data value.

17. The system of claim 15, wherein the group of padding bits includes padding value such that a sum of the padding value and a largest possible negative number represented by the relative bits is zero.

18. A system for receiving compressed digital data, comprising:
a memory;
a transmission module configured to receive a reduced data sequence that includes a flag bit and a first group of data bits; and
one or more processors configured to:
determining a state of the first group of data bits based on a value of the flag bit, wherein the state may be an absolute state or a relative state;
in response to determining the state as an absolute state:
extract the first group of data bits from the data sequence,
pad the first group of data bits with a group of padding bits, and
in response to determining the state as a relative state:
extract the first group of data bits from the data sequence,
obtain a previous data value,
determine a sign associated with the first group of data bits, and
add or subtract, depending on the sign, the first group of data bits to the previous data value to obtain a reconstructed data value.

19. The system of claim 18, wherein the group of padding bits includes a padding value such that a sum of the padding value and a largest possible negative number represented by the first group of data bits is zero.

20. The system of claim 18, wherein the one or more processors are further configured to validate an accuracy of the data sequence using one or more cyclic redundancy check bits associated with the data sequence.

21. The system of claim 18, further comprising a display that presents an image with a data having the reconstructed data value.

22. The system of claim 18, wherein the one or more processors are further configured to wait to receive a duplicate of the data sequence, request a duplicate of the data sequence, and ignore the data sequence.

* * * * *